Feb. 19, 1963   F. H. GARDNER ETAL   3,077,773
VANE ANGLE COMPUTER
Filed May 9, 1955   3 Sheets-Sheet 1

INVENTORS.
FREDERICK H. GARDNER
BY IRWIN A. KOHN
DAVID ROSENSTOCK
William R. Crane
ATTORNEY

United States Patent Office 3,077,773
Patented Feb. 19, 1963

3,077,773
VANE ANGLE COMPUTER
Frederick H. Gardner, Long Beach, Irwin A. Kohn, Lakewood, and David Rosenstock, Long Beach, Calif., assignors to North American Aviation, Inc.
Filed May 9, 1955, Ser. No. 506,974
9 Claims. (Cl. 73—180)

This invention pertains to a means for determining the angle of attack and angle of skid of an aircraft. This invention is also adapted to continuously compute the jump angle of rockets launched from an aircraft.

Every aircraft has a Cartesian set of coordinates which are fixed on the aircraft and which have a predetermined orientation on the aircraft. The convention which is commonly used will be used herein: that is, the origin of the set of axes is at the center of gravity of the aircraft. The fuselage reference line or X axis is defined in the general direction of the forward to aft direction of the aircraft. The pitch axis or Y axis extends through the center of gravity perpendicular to the fuselage reference line in a direction extending from side to side of the aircraft. The yaw axis or Z axis is perpendicular to the plane of the fuselage reference line and the pitch axis and passes through the center of gravity of the aircraft. The yaw axis and fuselage reference line define a plane of symmetry of the aircraft. The fuselage reference line is a fixed geometric design reference determined by the designer of the aircraft and corresponds generally to what may be called a roll axis although the actual axis about which an aircraft rolls depends upon various factors and is not rigorously synonymous with the fuselage reference line.

The angle of attack of an aircraft is defined as the angle between the fuselage reference line and the component of the velocity of the aircraft perpendicular to the pitch axis. The angle of skid of the aircraft is defined as the angle between the fuselage reference line and the component of the velocity of the aircraft perpendicular to the yaw axis.

When rockets are launched from an aircraft, they tend to align themselves with the relative wind. Consequently, when a rocket is launched, it turns part of the way through the angle of attack. The fraction or percentage of the angle of attack through which the rocket turns is designated the jump factor, $h$, while the angle through which the rocket turns is designated the jump angle, $h\alpha_T$.

Computers which have heretofore been utilized to compute flight data such as angle of skid and angle of attack have been mechanized to incorporate precision features which, although desirable from an integrated system standpoint, are very cumbersome and heavy. It was desirable to find a new device which computes angle of attack and angle of skid of aircraft and the jump angle of rockets launched from the aircraft with the lightest weight possible consistent with accuracy. The device contemplated by this invention is a package of the lightest weight and smallest size which is still adapted to cause accurate maneuverability and fire control of the aircraft of the fighter and interceptor types.

If a vane could be carried by an aircraft so that the vane was an appreciable distance away from the air disturbance caused by the motion of the aircraft through the air, the vane would align itself relative to the air mass in the direction of velocity of the aircraft. However, as the vane is brought closer and closer to the skin of its supporting aircraft, an error is introduced. The nature of this error can be found. The true angle of attack $\alpha_T$ can be expressed to be equal to $m\alpha_i + b$ wherein $\alpha_i$ is the average indicated angle of attack as measured by two rotatable vanes positioned on opposite sides of the fuselage reference line adjacent the skin of the aircraft and with their axes of rotation parallel to the pitch axis of the aircraft, $m$ is the empirical slope of the $\alpha_T$ vs. $\alpha_i$ curve and $b$ is the empirical zero intercept. Both $m$ and $b$ are functions of the Mach number, $M$, of the supporting aircraft. Hence $\alpha_T = \alpha_i f_1(M) + f_2(M)$. The functions $f_1(M)$ and $f_2(M)$ are determined for a particular vane location on the fuselage and vary for different locations. The angle of attack $\alpha_T$ is referred to the fuselage reference line.

An additional angle $\sigma$ must be added to refer the angle of attack to the armament datum line of the supporting aircraft. In an aircraft carrying rockets, the armament datum line is a line parallel to the direction of the tubes in which rockets are carried and ordinarily makes a small angle with the fuselage reference line, usually somewhat depressed in order to facilitate launching of the rockets when the pilot pulls up the nose of the aircraft in order to make a strike. Since rockets are carried in enclosures referred to as "pods," the resultant angle of attack relative to the armament datum line is identified by the symbol $\alpha_{POD}$. The angle $\Delta\alpha_i$ multiplied by $f_1(M)$ compensates for the vane installation angle. The resultant angle of atack relative to the armament datum line, $$\alpha_{POD} = (\alpha_i + \Delta\alpha_i)f_1(M) + f_2(M) + \sigma$$

For ease of mechanization, this equation may be rewritten as $$\alpha_{POD} = f_1(M)\left[(\alpha_i + \Delta\alpha_i) + \frac{f_2(M)}{f_1(M)} + \frac{\sigma}{f_1(M)}\right]$$

which is identical to $$\alpha_T = m\left[(\alpha_i + \Delta\alpha_i) + \frac{b}{m} + \frac{\sigma}{m}\right] \text{ if } m = f_1(M) \text{ and } b = f_2(M)$$

This equation is mechanized by the device of this invention as hereinafter described.

It is therefore an object of this invention to provide a novel angle of attack computer.

It is another object of this invention to provide a novel angle of skid computer.

It is another object of this invention to provide a novel jump angle computer.

It is yet another object of this invention to provide vane and computer means for computing the angle of attack of, skid and jump angle of an aircraft.

Other objects and features of invention will become apparent from the following description, in which FIG. 1 is a partial view of a typical aircraft showing a typical position of a vane utilized in this invention for computing the angle of attack of an aircraft;

Figure 7:
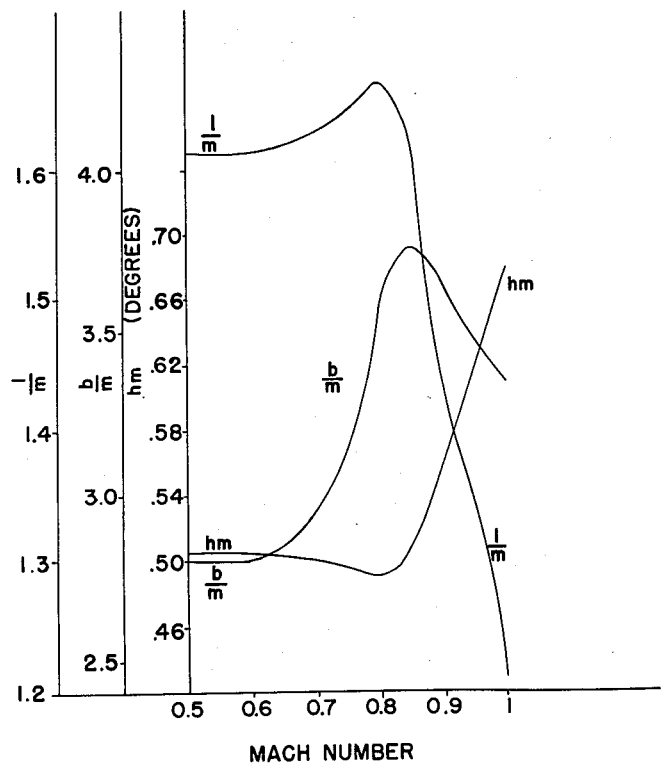

And FIG. 7 is a graph showing typical values of the parameters mechanized by the device of this invention.

Figure 1:
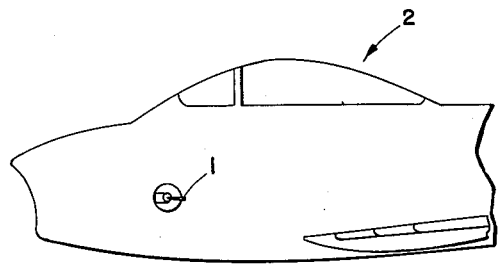

In FIG. 1, vane 1 is adjacent the skin of aircraft 2 and is adapted to be rotated about an axis of rotation which is parallel to the pitch axis of aircraft 2. Although a single vane may be used, it is sometimes preferable, as herein described, to utilize two vanes which have a common axis and are mounted upon opposite sides of aircraft 2 to compensate for variations in the angle of skid of aircraft 2.

Figure 2:
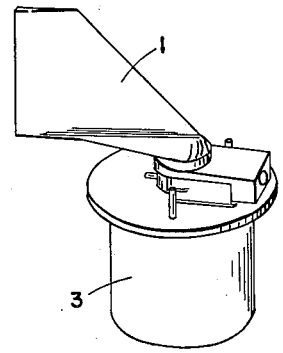
FIG. 2 is a view of a vane utilized in this invention together with its associated transducer.

As shown in FIG. 2, vane 1 is rotatably mounted relative to transducer 3. A second identical vane 41 may be similarly rotatably mounted relative to transducer 3 on the opposite side of the aircraft from vane 1. Vane 41 may be suitably mechanically coupled to the case of transducer 3 by means of a drive shaft 42, the case being free to move in accordance with the rotation of shaft 42. Transducer 3 may be, for example, a potential generator or transformer (such as the bearing mounted synchro described on pages 321–323 of volume 17 of the MIT Radiation Lab Series published in 1949) for generating a voltage proportional to the average of the angular positions of vane 1 and vane 41 relative to the fuselage reference or a potentiometer (such as the differential computing potentiometer model D-C-P manufactured by the Fairchild Corporation, Jamaica, N.Y.) whose slider and case are positioned relative to each other in accordance with the positions of these vanes. By the use of the average of the outputs of the two oppositely positioned vanes rather than a single vane output, errors in the output due to roll rate are effectively cancelled out.

Figure 3:
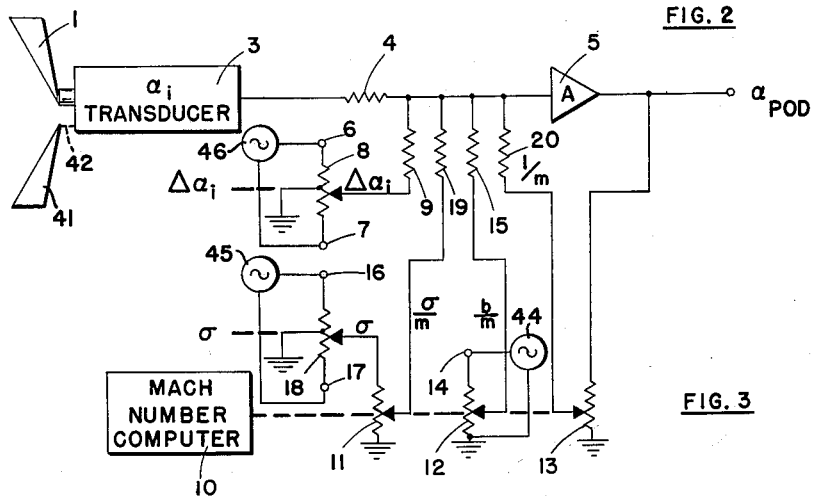
FIG. 3 is a view of a typical angle of attack computer of this invention.

The circuit of FIG. 3 is one embodiment of the angle of attack computer of this invention. Transducer 3 generates a voltage which is proportional to the average position relative to the fuselage reference of vane 1 and its counterpart vane 41 on the opposite side of aircraft 2. The average position of vane 1 and its counterpart vane 41 on the other side of aircraft 2, is designated herein as the indicated angle of attack, $\alpha_i$. The electrical output of transducer 3 is connected through resistor 4 to the input of summing amplifier 5.

Vane 1 and vane 41 have small bias errors due to misalignment. The combined biasing angle of these vanes is designated herein as $\Delta\alpha_i$. $\Delta\alpha_i$ is calibrated and introduced as a permanent correction voltage into the input of amplifier 5. A precision balanced voltage source 46 with grounded center tap is connected across terminals 6 and 7 of potentiometer 8, which has a grounded center tap. A correction proportional to $\Delta\alpha_i$ is handset into potentiometer 8. The movable arm of potentiometer 8 is connected through resistor 9 to the input of summing amplifier 5.

Figure 6:
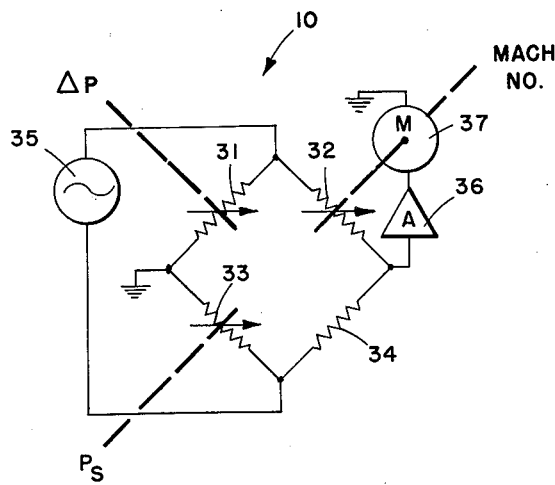
FIG. 6 is a Mach meter which may be used in conjunction with this invention.

Mach number computer 10, a version of which is shown typically in FIG. 6, generates a mechanical shaft rotation which is proportional to the computed Mach number upon aircraft 2. Mach number computer 10 is mechanically connected to drive the movable arms of potentiometers 11, 12 and 13, respectively.

Potentiometer 12 is nonlinear and is adjusted to have a nonlinearity which is similar to that shown in the curve for $b/m$ in FIG. 7 as a function of Mach number. An A.-C. voltage source 44 is connected across potentiometer 12 between terminal 14 and the ground terminal. The voltage upon the movable arm of potentiometer 12 is proportional to $b/m$. The movable arm of potentiometer 12 is connected through resistor 15 to the input of summing amplifier 5.

A balanced A.-C. voltage source with grounded center tap 45 is connected to terminals 16 and 17 of potentiometer 18 which has a grounded center tap to generate a voltage on the movable arm of potentiometer 18. Potentiometer 18 is handset to generate a voltage upon the movable arm thereof which is proportional to the angle $\sigma$ between the armament datum line and the fuselage reference line. The movable arm of potentiometer 18 is connected across potentiometer 11. Potentiometer 11 is a nonlinear potentiometer which is adjusted to multiply the $\sigma$ input by $1/m$. $1/m$ is a nonlinear function of Mach number which has a nonlinearity similar to that shown in FIG. 7. The movable arm of potentiometer 11 is connected through resistor 19 to the input of summing amplifier 5. Potentiometer 13 and resistor 20 form a feedback loop around amplifier 5. Potentiometer 13 is connected across the output of amplifier 5. The movable arm of potentiometer 13 is connected through resistor 20 to the input of amplifier 5 which divides the output of amplifier 5 by $1/m$ when potentiometer 13 is made identical to potentiometer 11. The output of amplifier 5 is thereby multiplied by $m$ to become proportional to the angle of attack of aircraft 2 with reference to its armament datum line.

Figure 4:
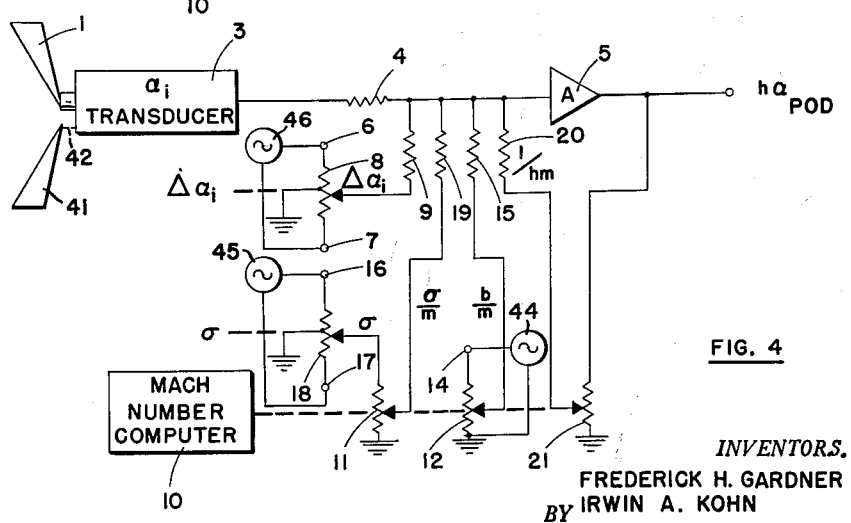
FIG. 4 is a schematic diagram of one embodiment of the device of this invention utilized to compute the jump angle of rockets launched from an aircraft.

The structure of FIG. 4 is identical to the structure of FIG. 3 except that potentiometer 21 connected across the output of amplifier 5 has a different nonlinearity from potentiometer 13 in FIG. 3. To obtain the jump angle of the rocket launched from aircraft 2 it is necessary to multiply the angle of attack by a jump factor $h$. Hence, jump angle equals $h\alpha_T$. Potentiometer 21 in FIG. 4 is nonlinear to have a resistance proportional not to $1/m$ but to $1/hm$. The function $hm$ is shown in FIG. 7. The output of amplifier 5 is divided by $1/hm$ through potentiometer 21 and resistor 20 so that the output thereof is multiplied by $hm$ to be proportional to the jump angle of the rockets launched from aircraft 2. A vane situated adjacent the skin of aircraft 2 so that its axis of rotation is parallel to the yaw axis of aircraft 2 indicates the angle of skid $\beta$. The true angle of skid $\beta$ is substantially equal to some constant times $\beta_i$ wherein $\beta_i$ is the indicated angle of skid. The effect of the angle of skid upon the computed angle of attack is empirically determined. Hence, $f_3(\beta,M)$ is an empirical function which differs for each aircraft.

The device shown in FIG. 4 has errors introduced into it if two angle of attack transducers, one situated on each side of the reference line of the aircraft, are not used. If only one attack angle vane is used, then the skid angle $\beta$ also affects the correct computation of $\alpha_T$. Hence the equation of $\alpha_T$ is as follows:

$$\alpha_T = m\alpha_i + b + f_3(\beta,M)$$

Figure 5:
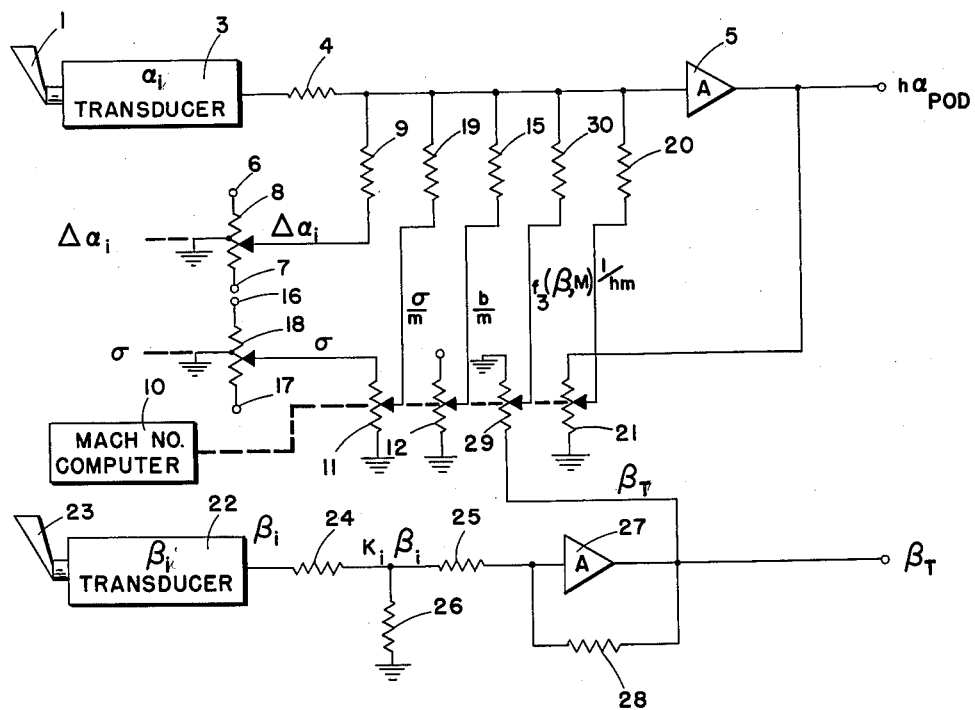
FIG. 5 is a schematic diagram of a second embodiment of this invention utilized to compute the jump angle of rockets launched from an aircraft.

FIG. 5 is in many respects similar to FIG. 4 except that means have been provided to introduce correction for the angle of skid into the computation for the angle of attack. Angle of skid transducer 22 is identical with angle of attack transducer 3 and is mechanically connected to be driven by vane 23 whose axis is parallel to the yaw axis of aircraft 2. The electrical output of transducer 22 generates an electrical voltage proportional to the indicated angle of skid. This electrical voltage is connected to a T-network of resistors 24, 25 and 26. Amplifier 27 is connected to the output of the T-network of resistors 24, 25 and 26. Resistor 28 is connected between the output and input of amplifier 27 to reduce the gain of amplifier 27 by a constant factor so that the output thereof is substantially equal to the true angle of skid rather than the indicated angle of skid. An additional potentiometer 29 is mechanically connected to be driven by means of Mach number computer 10 and is electrically connected to the output of amplifier 27. The movable arm of potentiometer 29 is connected through resistor 30 to the input of amplifier 5 to correct for the angle of skid of aircraft 2. In all other respects the circuit of FIG. 5 is identical to the circuit of FIG. 4. It is to be noted that the output of amplifier 5 would be proportional to the angle of attack rather than the jump angle if potentiometer 13 were used rather than potentiometer 21 in the circuit of FIG. 5.

A typical Mach number computer is shown in FIG. 6. Potentiometers 31, 32 and 33 are connected with resistor 34 to form a Wheatstone bridge. Voltage source 35 is connected across the input of the Wheatstone bridge of potentiometers 31, 32, 33 and resistor 34 while amplifier 36 is connected across the output of the Wheatstone bridge. Motor 37 is connected to be driven by means of amplifier 36 and to drive the movable arm of potentiometer 32. Potentiometer 31 is connected to be driven by means of a differential pressure transducer (not shown) which measures the pressure between ram and static pressure upon aircraft 2. Potentiometer 33 is connected to be driven by means of a static pressure transducer (not shown) which measures the static pressure upon aircraft 2. The resistance of potentiometer 32 is nonlinear so that when potentiometer 32 is adjusted to null the output of the Wheatstone bridge, the shaft position of motor 37 is exactly proportional to the Mach number at which aircraft 2 is flying.

Thus, a simplified angle of attack computer and jump angle computer has been provided by this invention which is light weight and accurate for use in modern rocketry equipment fired from rapidly moving aircraft.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for computing the angle of attack of an aircraft comprising a pair of aerodynamic vanes positioned within the air stream on opposite sides of the fuselage reference line of said aircraft adjacent the skin of said aircraft rotatably mounted with a common axis of rotation parallel to the pitch axis of said aircraft, transducer means mechanically connected to be controlled by movement of said vanes for generating an electrical signal proportional to the combined average orientation of said vanes about their common axis of rotation relative to a common reference position, a Mach number computer, and computer means responsive to the outputs of said transducer means and said Mach number computer to generate a signal proportional to the true angle of attack of said aircraft.

2. The device as recited in claim 1 for an aircraft having rocket pods, in which the computer means includes means for generating an electrical signal proportion to a predetermined function of the angle of skid of said aircraft.

3. In combination, a pair of vones rotatably mounted upon opposite sides of an aircraft with a common axis of rotation parallel to the pitch axis of said aircraft and positioned in the air flow adjacent the skin of said aircraft; transducer means mechanically attached to said vanes for generating an electrical signal proportional to the combined average orientation of said vanes about their axis of rotation relative to the fuselage reference line of said aircraft; means for generating transducer correction signals, said correction signals being a predetermined function of the Mach number of said aircraft, and a summing amplifier, said means for generating transducer correction signals and the output of said transducer means being connected to the input of said summing amplifier, whereby a signal proportional to the true angle of attack of said aircraft is generated.

4. The device recited in claim 3 in which said means for generating correction signals comprises a Mach number computer, and means for generating corrections in accordance with $$\frac{1}{m} \text{ and } \frac{b}{m}$$

the outputs of said means for generating being multiplied by the output of said Mach number computer where $m$ and $b$ are empirically derived functions of Mach number.

5. The device recited in claim 3, said aircraft having rocket tubes, and further comprising means for generating a correction signal dependent upon the angle between said rocket tubes and the fuselage reference line of said aircraft, said correction signal being proportional to the jump angle of rockets launched from said aircraft, said correction signal being fed to the input of said summing amplifier.

6. A vane angle computer for use in an aircraft comprising a pair of vanes rotatably mounted on opposite sides of said aircraft, said vanes having a common axis of rotation and being positioned in the air flow adjacent the skin of said aircraft, a transducer mechanically coupled to said vanes, said transducer having an output signal proportional to the combined average of the orientations of said vanes about their common axis of rotation relative to the fuselage reference line of said aircraft, a Mach number computer having a mechanical output proportional to Mach number, a plurality of potentiometers, each of said potentiometers having a respective taper which is a separate predetermined function of Mach number, an alternating voltage reference source coupled across the ends of one of said potentiometers, the slider arms of said potentiometers being mechanically coupled to said Mach number computer output, and a summing amplifier, the output of said transducer and said potentiometer slider arms being coupled to the input of said amplifier, the output of said amplifier being coupled across the ends of another of said potentiometers.

7. The device as recited in claim 6 wherein one of said potentiometers has a taper which is a function of $$\frac{b}{m}$$

and said another of said potentiometers has a taper which is a function of $$\frac{1}{m}$$

where true angle of attack is equal to $m$ times the output of said transducer plus $b$, and $m$ and $b$ are empirically derived functions of Mach number.

8. A vane angle computer for use in an aircraft comprising at least one vane rotatably mounted on said aircraft, said vane being positioned in the air flow adjacent the skin of said aircraft, a transducer mechanically coupled to said vane, said transducer having an output signal proportional to the orientation of said vane about its axis of rotation relative to the fuselage reference line of said aircraft, a Mach number computer having a mechanical output proportional to Mach number, a plurality of potentiometers, one of said potentiometers having a taper which is a function of $$\frac{1}{m}$$

another of said potentiometers having a taper which is a function of $$\frac{b}{m}$$

the true angle of attack being equal to $m$ times the output of said transducer plus $b$ and $m$ and $b$ being empirically derived functions of Mach number, an alternating voltage reference source coupled across the ends of said potentiometer having a taper which is a function of $$\frac{b}{m}$$

the slider arms of said potentiometers being mechanically coupled to said Mach number computer, and a summing amplifier, the output of said transducer and said potentiometer slider arms being coupled to the input of said amplifier, the output of said summing amplifier being coupled across the ends of said potentiometer having a taper which is a function of $$\frac{1}{m}$$

9. A true angle of attack computer for an aircraft comprising a rotatably mounted vane positioned in the airflow adjacent said aircraft; transducer means responsively coupled to said vane for generating an indicated angle of attack signal indicative of the rotation of said vane relative to a reference; and computer means for correcting said indicated angle of attack signal, said computer means comprising means for generating a signal indicative of the Mach number of said aircraft, a summing amplifier, means responsively connected to said amplifier and said Mach number generating means for multiplying the outputs thereof, the output of said multiplying means being coupled to the input of said amplifier as a negative feedback signal thereto, the output of said transducer means being coupled to the input of said amplifier, and means responsive to said Mach number generating means for generating a signal which is a predetermined function of Mach number, the output of said means for generating a signal which is a predetermined function of Mach number being fed to the input of said summing amplifier, whereby the output of said amplifier indicates true angle of attack.

References Cited in the file of this patent

UNITED STATES PATENTS

| | | |
|---|---|---|
| 2,538,303 | Findley | Jan. 16, 1951 |
| 2,617,615 | Von Eschen | Nov. 11, 1952 |
| 2,662,706 | Gille | Dec. 15, 1953 |
| 2,699,065 | Blair | Jan. 11, 1955 |
| 2,701,111 | Schuck | Feb. 1, 1955 |
| 2,714,309 | Redemske | Aug. 2, 1955 |
| 2,761,315 | Anderson et al. | Sept. 4, 1956 |
| 2,855,779 | Zaid | Oct. 14, 1958 |
| 2,955,761 | Brown et al. | Oct. 11, 1960 |